United States Patent
Kilos et al.

(10) Patent No.: US 12,522,552 B2
(45) Date of Patent: Jan. 13, 2026

(54) PROCESS FOR PRODUCING (POLY)ALKYLENE GLYCOL MONOALKYL ETHERS

(71) Applicant: Dow Global Technologies LLC, Midland, MI (US)

(72) Inventors: Beata A. Kilos, Midland, MI (US); Aditya Bhan, Minneapolis, MN (US); Amy Wetzel, Midland, MI (US); Wen-Sheng Lee, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 457 days.

(21) Appl. No.: 18/023,981

(22) PCT Filed: Sep. 2, 2021

(86) PCT No.: PCT/US2021/048830
§ 371 (c)(1),
(2) Date: Feb. 28, 2023

(87) PCT Pub. No.: WO2022/051469
PCT Pub. Date: Mar. 10, 2022

(65) Prior Publication Data
US 2023/0312446 A1    Oct. 5, 2023

Related U.S. Application Data

(60) Provisional application No. 63/074,563, filed on Sep. 4, 2020.

(51) Int. Cl.
C07C 41/06 (2006.01)
B01J 29/70 (2006.01)
B01J 35/64 (2024.01)

(52) U.S. Cl.
CPC ........... *C07C 41/06* (2013.01); *B01J 29/7057* (2013.01); *B01J 35/643* (2024.01)

(58) Field of Classification Search
CPC ............................... C07C 41/06; C07C 43/13
USPC ....................................................... 568/672
See application file for complete search history.

(56) References Cited

U.S. PATENT DOCUMENTS

| | | |
|---|---|---|
| 5,741,948 A | 4/1998 | Kirishiki et al. |
| 6,995,111 B2 | 2/2006 | Levin et al. |
| 9,180,430 B2 | 11/2015 | Liu et al. |
| 2001/0007047 A1 | 7/2001 | Onda et al. |
| 2004/0097770 A1 | 5/2004 | Dakka et al. |

FOREIGN PATENT DOCUMENTS

JP    2001011003 A    1/2001

OTHER PUBLICATIONS

International Preliminary Report on Patentability for related PCT Application PCT/US2021/048830, mailed on Mar. 16, 2023 (7 pgs).
Lu, et al., "Catalytic conversion of methanol to olefins over rare earth (La, Y) modified SAPO-34" Reaction Kinetics and Catalysis Letters, vol. 97, Issue 2 (Jul. 11, 2009), pp. 255-261 ( 7 pgs).
Hajiashrafi, et al., "Preparation and characterization of lanthanide modified SAPO-34 nano catalysts and measurement of their activity for methanol to olefin conversion" Reaction Kinetics, Mechanisms and Catalysis, vol. 113, Issue 2, (Jul. 22, 2014), pp. 585-603 (19 pgs).
Hwang, et al., "Bifunctional strategy coupling Y2O3-catalyzed alkanal decomposition with methanol-to-olefins catalysis for enhanced lifetime" ACS Catalysis, vol. 7, (Jun. 2, 2017), pp. 4417-4422 (6 pgs).
Kim, et al., "Coke-tolerant Gadolinium-promoted HZSM-5 catalyst for methanol conversion into hydrocarbons" ChemCatChem, vol. 9, Issue 9 (Feb. 24, 2017), pp. 1569-1573 (5 pgs).
Amoozegar, et al., "Enhancement of catalytic properties and lifetime of nanostructured SAPO-34 by La isomorphous substitution and alteration of Si/Al ratio used in methanol conversion to light olefins" RSC Advances, vol. 6 (May 12, 2016), pp. 51024-51036 (13 pgs).
International Search Report & Written Opinion for related PCT Application No. PCT/US2021/048830, mailed Jan. 4, 2022 (13 pgs).

*Primary Examiner* — Ana Z Muresan
(74) *Attorney, Agent, or Firm* — Arthur R. Rogers

(57) ABSTRACT

Embodiments are directed towards a process for producing a (poly)alkylene glycol monoalkyl ether. The process includes providing an admixture of a crystalline metallosilicate molecular sieve catalyst and an oxide of a metal and reacting in a liquid phase process an olefin and a (poly)alkylene glycol in the presence of the admixture to yield the (poly)alkylene glycol monoalkyl ether. Reacting the olefin and the (poly)alkylene glycol in the presence of the admixture is at a temperature of 80° C. to 200° C.

15 Claims, No Drawings

PROCESS FOR PRODUCING (POLY)ALKYLENE GLYCOL MONOALKYL ETHERS

This application is a National Stage Application under 35 U.S.C. § 371 of International Application Number PCT/US2021/048830, filed Sep. 2, 2021 and published as WO 2022/051469 A1 on Mar. 10, 2022, which claims the benefit to U.S. Provisional Application 63/074,563, filed Sep. 4, 2020, the entire contents of which are incorporated herein by reference in its entirety

FIELD OF DISCLOSURE

Embodiments of the present disclosure are directed towards producing (poly)alkylene glycol monoalkyl ethers.

BACKGROUND

Crystalline metallosilicate sieve catalysts, particularly beta zeolites, have been used for producing (poly)alkylene glycol monoalkyl ethers from olefins and (poly)alkylene glycols. At typical reaction temperatures of 100° C. to 200° C., crystalline metallosilicate molecular sieve catalyst have an olefin conversion percentage rate of around 10% to 50% with mono-ether selectivity being around 60% to 95% and di-ether selectivity around 5% to 40%, respectively. As olefin conversion increases, mono-ether and di-ether selectivity usually decreases and increases, respectively. The mono-ether is the desired product, which is used in the downstream ethoxylation process to produce desired alcohol ethoxylate surfactant products. The presence of di-ether, in contrast, can impact the properties of the surfactant products and is therefore undesirable. Since mono-ether is the desired product, maintaining an increased mono-ether selectivity at high olefin conversion is desired.

The global alcohol ethoxylate surfactant market is currently dominated by primary alcohol ethoxylates (PAEs). Although providing superior performance (e.g., wetting, foaming, handling, etc.), secondary alcohol ethoxylates (SAEs) only have a small market share due to their higher prices compared to PAEs. One reason for their higher cost is that SAEs require several cost intensive reactions with starting materials (e.g., (poly)alkylene glycol monoalkyl ether intermediates) that have a limited availability and as such an associated high cost.

Given the limited sources and high cost for the (poly)alkylene glycol monoalkyl ether starting materials used in SAE production there is a need in the art for an alternative cost effective approach to producing (poly)alkylene glycol monoalkyl ethers. Thus, the development of catalytic processes with high selectivity and good olefin conversion (>10%) along with catalyst stability in the production of (poly)alkylene glycol monoalkyl ethers is desired and needed in the art.

SUMMARY

The present disclosure provides for the production of (poly)alkylene glycol monoalkyl ethers for use in producing secondary alcohol ethoxylates (SAEs) in a cost effective manner. The process of the present disclosure helps address the above-mentioned problems of the prior art by providing a process that produces (poly)alkylene glycol monoalkyl ethers with both high selectivity and high yield. Specifically, the present disclosure provides for an admixture of a crystalline metallosilicate molecular sieve catalyst and an oxide of a metal that together provide for both a high selectivity for (poly)alkylene glycol monoalkyl ethers and high olefin conversion. In addition, improvements in the stability of the crystalline metallosilicate molecular sieve catalyst due the presence of the oxide of the metal, as discussed herein, help to maintain the selectivity and activity of the crystalline metallosilicate molecular sieve catalyst.

The present disclosure provides for a process for producing a (poly)alkylene glycol monoalkyl ether that includes providing an admixture of a crystalline metallosilicate molecular sieve catalyst and an oxide of a metal, where the metal is selected from the group consisting of a Group 3 metal, a Lanthanide element and a combination thereof; and reacting in a liquid phase process an olefin and a (poly)alkylene glycol in the presence of the admixture of the crystalline metallosilicate molecular sieve catalyst and the oxide of the metal to yield the (poly)alkylene glycol monoalkyl ether.

For the various embodiments, the crystalline metallosilicate molecular sieve catalyst is a crystalline metallosilicate molecular sieve catalyst having a pore size of 0.5 to 1.2 nanometer. In additional embodiments, the crystalline metallosilicate molecular sieve catalyst is an aluminosilicate zeolite catalyst. Preferably, the crystalline metallosilicate molecular sieve catalyst is a BEA-Type zeolite structure. In additional embodiments, the crystalline metallosilicate molecular sieve catalyst includes a proton ($H^+$) to provide Brønsted acid sites on the crystalline metallosilicate molecular sieve catalyst. For the various embodiments, the crystalline metallosilicate molecular sieve catalyst can also contain at least one metal element selected from the group consisting of Fe, Ga and B. For the various embodiments, the crystalline metallosilicate molecular sieve catalyst has a silicon-to-metal atomic ratio of 5 to 150.

For the various embodiments, the metal of the oxide is selected from the group consisting of elements Yttrium, Lanthanum, Neodymium, Gadolinium, Holmium, Ytterbium and combinations thereof. In specific examples, the metal of the oxide is selected from the group consisting of $Y_2O_3$, $La_2O_3$, $Nd_2O_3$, $Gd_2O_3$, $Ho_2O_3$, $Yb_2O_3$, and combinations thereof.

For the various embodiments, the olefin is an alpha-olefin having 6 to 30 carbon atoms. In some embodiments, the alpha-olefin has 10 to 20 carbon atoms. For the various embodiments, the (poly)alkylene glycol has 2 to 8 carbon atoms. In one specific embodiments, the (poly)alkylene glycol is mono-ethylene glycol.

The process of the present disclosure can be performed in a batch reactor, a continuous reactor or a semi-continuous reactor. The process of the present disclosure is also conducted in a liquid phase, where the crystalline metallosilicate molecular sieve catalyst is either in a fixed bed, fluidized bed or in suspension. Reacting the olefin and the (poly)alkylene glycol in the presence of the admixture is at a temperature of 80° C. to 200° C. Reacting the olefin and the (poly)alkylene glycol in the presence of the admixture is at a temperature of 100° C. to 150° C.

DETAILED DESCRIPTION

The present disclosure provides for the production of (poly)alkylene glycol monoalkyl ethers for use in producing secondary alcohol ethoxylates (SAEs) in a cost effective manner. The process of the present disclosure helps address the above-mentioned problems of the prior art by providing a liquid phase process that produces (poly)alkylene glycol monoalkyl ethers with both high selectivity and high yield.

Specifically, the present disclosure provides for an admixture of a crystalline metallosilicate molecular sieve catalyst and an oxide of a metal that together provide for a high reaction rate between an olefin and a (poly)alkylene glycol along with both a high selectivity for (poly)alkylene glycol monoalkyl ethers and high olefin conversion. In addition, improvements in the stability of the crystalline metallosilicate molecular sieve catalyst due the presence of the oxide of the metal, as discussed herein, help to maintain the selectivity and activity of the crystalline metallosilicate molecular sieve catalyst.

As provided herein, the present disclosure has found that the addition of oxides selected among a Group 3 metal (e.g., yttrium oxide ($Y_2O_3$) or at least one oxide of the Lanthanide Series (atomic numbers 57-71) to a crystalline metallosilicate molecular sieve catalyst (e.g., molecular sieve catalyst, such as zeolite Beta) significantly increases the stability and lifetime of the catalyst during mono-ether production over an extended time (e.g., hours of reaction time at reaction temperatures of 100° C. to 150° C.). As discussed herein, the admixture of the crystalline metallosilicate molecular sieve catalyst and the oxide of a metal enhances the catalyst lifetime by decreasing production of oxygenate byproducts that can be detrimental to subsequent down-stream reactions, where the oxygenate byproducts include, among others, aldehydes, ketones, esters, ethers, carboxylic acids and other alcohols.

Chemical elements referenced herein (e.g., Group 3 metals and elements of the Lanthanide Series (atomic numbers 57-71)) are from the IUPAC Periodic Table dated 1 Dec. 2018.

The present disclosure provides for a process for producing a (poly)alkylene glycol monoalkyl ether that includes providing an admixture of a crystalline metallosilicate molecular sieve catalyst and an oxide of a metal, where the metal is selected from the group consisting of a Group 3 metal, a Lanthanide element and a combination thereof; and reacting in a liquid phase process an olefin and a (poly)alkylene glycol in the presence of the admixture of the crystalline metallosilicate molecular sieve catalyst and the oxide of the metal to yield the (poly)alkylene glycol monoalkyl ether.

The crystalline metallosilicate molecular sieve catalyst of the present disclosure are microporous, crystalline silicate materials composed of corner-sharing $SiO_4$ and $AlO_4$— tetrahedra. The neighboring $SiO_4$ and $AlO_4$— tetrahedra are bridged by oxygen atoms and are regularly arranged into a three-dimensional system of cages and pores, where the pore size is highly uniform, which gives rise to their 'molecular sieving' ability. Given this, the crystalline metallosilicate molecular sieve catalyst of the present disclosure is preferably a crystalline metallosilicate molecular sieve catalyst having a pore size of 0.5 to 1.2 nanometer. More preferably, the crystalline metallosilicate molecular sieve catalyst is a crystalline metallosilicate molecular sieve catalyst having a pore size of 0.5 to 0.8 nanometer.

Examples of such molecular sieves of the crystalline metallosilicate molecular sieve catalysts include framework-type zeolite and zeolite-type molecular sieves, whose structures are classified by the Structure Commission of the International Zeolite Association according to the rules of the IUPAC Commission on Zeolite Nomenclature. Preferably, the crystalline metallosilicate molecular sieve catalyst of the present disclosure is an aluminosilicate zeolite catalyst. Such aluminosilicate zeolite catalyst structures are assigned a three letter code as provided in the Atlas of Zeolite Framework Types, 5th edition, Elsevier, London, England (2001), which is incorporated by reference herein. Non-limiting examples of the aluminosilicate zeolite catalysts for the present disclosure include those having a medium pore size, which include AFO, AEL, EUO, HEU, FER, MEL, MFI, MTW, MTT, TON and substituted forms thereof; and those having a large pore size, which include EMT, BEA, LTL, FAU, MER, MOR and substituted forms thereof. Non-limiting examples of preferred molecular sieve structures for the aluminosilicate zeolite catalysts for the present disclosure include MFI, MEL, BEA (e.g., BEA-Type zeolite), FAU (e.g., Y-type zeolite), MOR, MTW and LTL. Preferably, the crystalline metallosilicate molecular sieve catalyst is a BEA-Type zeolite structure.

The crystalline metallosilicate molecular sieve catalysts of the present disclosure can also be converted to include cations outside their crystal lattices. Such cations can include $H^+$, $NH_4^+$, $Li^+$, $Na^+$, $Rb^+$, $C^+$, $Mg^{2+}$, $Ca^{2+}$, $Sr^{2+}$, $Ba^{2+}$, $Sc^{3+}$, $Y^{3+}$, $La^{3+}$, $R_4N^+$, $R_4P^+$ (R is H or an alkyl group) and combinations thereof. Preferably the crystalline metallosilicate molecular sieve catalysts of the present disclosure include $H^+$ (a proton) to provide Brønsted acid sites on the crystalline metallosilicate molecular sieve catalyst. The number of Brønsted acid sites is proportional to the $AlO_4$— content and is thus related to the silicon-to-metal (e.g., aluminum) atomic ratio of the structure. The overall Brønsted acidic properties of the zeolite of the present disclosure is a combination of both its site strength and density, and hence its silicon-to-metal atomic ratio. For the various embodiments, the crystalline metallosilicate molecular sieve catalyst of the present disclosure preferably has a silicon-to-metal atomic ratio of 5 to 1500. More preferably, the crystalline metallosilicate molecular sieve catalyst has a silicon-to-metal atomic ratio of 5 to 300. Most preferably, the crystalline metallosilicate molecular sieve catalyst has a silicon-to-metal atomic ratio of 5 to 150.

For the various embodiments, the crystalline metallosilicate molecular sieve catalyst can also include at least one other metal introduced into a crystal lattice in place of the Al atom. Specific examples of such metal element include B, Ga, In, Ge, Sn, P, As, Sb, Sc, Y, La, Ti, Zr, V, Cr, Mn, Fe, Co, Ni, Cu, Zn. Preferably, the crystalline metallosilicate molecular sieve catalyst of the present disclosure can contain at least one metal element selected from the group consisting of Fe, Ga and B. Any of the above mentioned metals can be used either alone or in combinations of two or more thereof.

For the various embodiments, the crystalline metallosilicate molecular sieve catalysts provided herein may be used alone (e.g., neat) or as an admixture of two or more of the crystalline metallosilicate molecular sieve catalysts.

The crystalline metallosilicate molecular sieve catalysts provided herein can be synthesized as is known in the art. Generally, the crystalline metallosilicate molecular sieve catalyst can be synthesized by a hydrothermal synthesis process. The hydrothermal synthesis process of producing a crystalline metallosilicate molecular sieve catalyst includes heating a composition of a silica source, a metal source and a quaternary ammonium salt such as tetrapropylammonium salt or the like at a temperature of 100° C. to 175° C. until a crystal is formed. The crystal is then filtered, washed with water and dried. The dried crystal is then calcined at a temperature of 350° C. to 600° C. By way of example, the silica source can be selected from sodium silicate, silica sol, silica gel, an alkoxysilane among other sources. The metal source can be selected from various inorganic or organic metal compounds as are known in the art.

Examples of the metal compounds are metal salts such as metal sulfate [e.g. $Al_2(SO_4)_3$], metal nitrate [e.g. $Fe(NO_3)_3$], alkali metal salt of metal oxide [e.g. $NaAlO_2$] and the like; metal halides such as metal chloride [e.g. $TiCl_4$], metal bromide [e.g. $MgBr_2$] and the like; and metal alkoxides [e.g. $Ti(OC_2H_5)_4$].

The crystalline metallosilicate molecular sieve catalysts of the present disclosure are also commercially available from commercial sources such as CP814E, CP814C, CP811C-300, CBV 712, CBV 720, CBV 760, CBV 2314, CBV 10A from ZEOLYST INTERNATIONAL™ of Conshohocken, PA.

The crystalline metallosilicate molecular sieve catalyst obtained as above can be converted as necessary to include cations outside their crystal lattices. For example, a $H^+$ containing crystalline metallosilicate molecular sieve catalyst can be prepared by stirring the crystalline metallosilicate molecular sieve catalyst in an aqueous solution of HCl, $NH_4Cl$, $NH_3$ or the like to convert the cation contained in the metallosilicate, to $H^+$ or $NH_4^+$, then subjecting the resulting solid product to filtration, washing with water and drying, and calcining the dried product at a temperature of 350° C. to 600° C. A crystalline metallosilicate molecular sieve catalyst containing an intended cation other than $H^+$ can be prepared by using an aqueous solution or volatile precursor of the intended cation and subjecting a crystalline metallosilicate molecular sieve catalyst to ion-exchange procedure as above. Examples of such teachings include ion-exchange with alkali and alkaline earth metals in solution, such Na, Ca, Mg-exchange, as well as vapor-phase ion-exchange using volatile molecular precursor such as: Ga, Mo, Re.

The crystalline metallosilicate molecular sieve catalysts of the present disclosure may be in a variety of forms, including powder, granular and/or a predefined molded shape.

The oxide of the metal for the present disclosure include oxide of a Group 3 metal and the Lanthanide Series of metals, which include elements having an atomic number of 57 to 71. As noted above, the chemical elements as provided herein are from the IUPAC Periodic Table dated 1 Dec. 2018. Preferred metals of the oxide are selected from the group consisting of elements yttrium, lanthanum, neodymium, gadolinium, holmium, ytterbium and combinations thereof. The most preferred oxide of the metal is yttrium oxide, lanthanum oxide, neodymium oxide, gadolinium oxide, holmium oxide, ytterbium oxide and mixtures thereof. Specific preferred oxides of the above identified metals include the metal of the oxide selected from the group consisting of $Y_2O_3$, $La_2O_3$, $Nd_2O_3$, $Gd_2O_3$, $Ho_2O_3$, $Yb_2O_3$ and combinations thereof. Preferably, the oxide of the metal for the present disclosure is $Y_2O_3$.

The oxide of the metal for the present disclosure can be prepared using a variety of techniques as are known in the art. The oxide of the metal for the present disclosure as provided herein are also commercially available from such commercial sources as Sigma-Aldrich.

When used as an admixture with the crystalline metallosilicate molecular sieve catalysts of the present disclosure, such oxides of the metals as provided herein provide benefits in catalytic conversion processes, particularly the conversion of an olefin and a (poly)alkylene glycol to yield the (poly)alkylene glycol monoalkyl ether. In addition, the admixture of the crystalline metallosilicate molecular sieve catalyst and the oxide of the metal helps to surprisingly reduce the production of detrimental side products during the reaction, where such detrimental side products can include oxygenated byproducts. Examples of such oxygenation byproducts include, but are not limited to, alkanols, aldehydes, ketones, esters, ethers and carboxylic acids.

The use of the oxide of the metal with the crystalline metallosilicate molecular sieve catalysts according to the present disclosure is also effective in extending of the useful life of the crystalline metallosilicate molecular sieve catalysts.

The admixture of the present disclosure includes 5 to 95 percent by weight (wt. %) of the crystalline metallosilicate molecular sieve catalyst and 95 to 5 wt. % of the oxide of the metal, where the wt. % is based on the total weight of the admixture. Preferably, the admixture includes 25 to 90 wt. % of the crystalline metallosilicate molecular sieve catalyst and 75 to 10 wt. % of the oxide of the metal, where the wt. % is based on the total weight of the admixture. More preferably, the admixture includes 50 to 87.5 wt. % of the crystalline metallosilicate molecular sieve catalyst and 50 to 12.5 wt. % of the oxide of the metal, where the wt. % is based on the total weight of the admixture. For the various embodiments, the admixture includes only the crystalline metallosilicate molecular sieve catalyst and the oxide of the metal, where the wt. % of these two components totals 100 wt. %. The admixture can be produced by mixing the crystalline metallosilicate molecular sieve catalyst and the oxide of the metal at room temperature (23° C.) and under atmospheric pressure (101,325 Pa).

The (poly)alkylene glycol of the present disclosure include homopolymers of ethylene oxide, propylene oxide, or butylene oxide; or the copolymers of ethylene oxide, propylene oxide, and/or butylene oxide. For the various embodiments, the (poly)alkylene glycol of the present disclosure has 2 to 8 carbon atoms. Specific examples of (poly)alkylene glycols of the present disclosure include, but are not limited to, ethane-1,2-diol; propane-1,2-diol; propane-1,3-diol; butane-1,2-diol; butane-1,3-diol; butane-1,4-diol; butane-2,3-diol; 2,2'-osydi(ethan-1-ol) and 2,2'-[ethane-1,2-diylbis(oxy)]di(ethan-1-ol). Other (poly)alkylene glycols are also possible (e.g., hexane-1,6-diol). Preferably, the (poly)alkylene glycol is mono-ethylene glycol. The (poly)alkylene glycol of the present disclosure can be used alone (e.g., neat) or as an admixture of two or more of the (poly)alkylene glycols.

The olefin of the present disclosure includes alkenes having 6 to 30 carbon atoms. Preferably, the olefin of the present disclosure is an alpha-olefin having a non-cyclic structure that can be either linear (non-branched) or branched. Preferably, the olefin of the present disclosure has a single carbon-carbon double bond (e.g., a monoene). Preferably, the olefin of the present disclosure is an alpha-olefin having 10 to 20 carbon atoms. More preferably, the olefin of the present disclosure is an alpha-olefin having 12 to 14 carbon atoms. Specific examples of the olefin of the present disclosure include: ethylene, propylene, but-1-ene, but-2-ene, 2-methylprop-1-ene, buta-1,3-diene, hex-1-ene, hex-2-ene, hex-3-ene, oct-1-ene, dec-1-ene, dodec-1-ene, tridec-1-ene, tetraden-1-ene, octadic-1-ene and icos-1-ene. Preferably, the olefin can be dodec-1-ene. The olefin of the present disclosure can be used alone (e.g., neat) or as an admixture of two or more olefins.

In the present disclosure, the reaction between olefin and (poly)alkylene glycol is conducted in a liquid phase process. The reaction in the liquid phase in the presence or absence of a solvent. Examples of such solvents (when present) include, but are not limited to nitromethane, nitroethane, nitrobenzene, dioxane, ethylene glycol dimethyl ether, sulfolane, benzene, toluene, xylene, hexane, cyclohexane, decane, paraffin, diethylene glycol dimethyl ether, triethylene glycol dimethyl ether, methyl benzoate, dimethyl phthalate, guaiacol, cresols and combinations thereof.

Suitable molar ratios of olefin to (poly)alkylene glycol for the process for producing the (poly)alkylene glycol monoalkyl ether can include 0.01 to 20, 0.1 to 10, 0.5 to 5 and 0.9 to 4.

Temperatures for reacting the olefin and the (poly)alkylene glycol in the presence of the admixture in the liquid phase can be from 80° C. to 200° C. preferably 100° C. to 150° C.

Pressures for reacting the olefin and the (poly)alkylene glycol in the presence of the admixture in the liquid phase can be at pressure reduced from atmospheric pressure (101, 325 Pa), atmospheric pressure or at a pressure higher than atmospheric pressure. Preferably, the pressure for reacting the olefin and the (poly)alkylene glycol in the presence of the admixture in the liquid phase is atmospheric pressure.

The reaction of the present disclosure can be conducted as a liquid phase process in a batch, semi-batch, or a continuous process. When a continuous process is used, the reaction can be conducted in a fluidized bed type reactor, a fixed bed type reactor and/or a stirring tank type reactor.

For the liquid phase process, the admixture, as provided herein, the olefin and the (poly)alkylene glycol are fed a reactor of the given process, where they are mixed at the desired temperature and pressure to allow the olefin and the (poly)alkylene glycol to react in the presence of the admixture of the crystalline metallosilicate molecular sieve catalyst and the oxide of the metal to yield the (poly)alkylene glycol monoalkyl ether.

The amount of admixture present in the liquid phase process when reacting the olefin and the (poly)alkylene glycol can be from 1 weight percent (wt. %) to 30 wt. % based on the total weight of the reaction mixture. Preferably, the amount of admixture present in the liquid phase process when reacting the olefin and the (poly)alkylene glycol is from 5 wt. % to 15 wt. % based on the total weight of the reaction mixture.

Reaction times for the liquid phase process of the present disclosure can range from 0.1 to 10 hours. Preferably, reaction times for the liquid phase process of the present disclosure range from 0.5 to 5 hours and more preferably from 1 hour to 3 hours. As appreciated, reaction times vary based on a number of factors, which include the reaction temperature, the reaction pressure, the amount of catalyst present in the reaction and the amounts and kinds of olefin and (poly)alkylene glycol used in the reaction.

After the reaction, the catalyst can be separated from the reaction products by centrifugation and/or filtration. After separating the catalyst, the (poly)alkylene glycol monoalkyl ether can be separated from other components of the reaction products (e.g., (poly)alkylene glycol and olefin) by extraction or distillation.

EXAMPLES

Materials

Each of the following materials is commercially available from Sigma-Aldrich unless otherwise indicated. Mono-ethylene glycol (MEG, 62.07 gram(g)/mole, ≥99%); Lanthanum (III) Oxide ($La_2O_3$, 99.999%); Holmium (III) Oxide ($Ho_2O_3$, ≥99.9%); Gadolinium (III) Oxide ($Gd_2O_3$, 99.9%); Neodymium (III) Oxide ($Nd_2O_3$, ≥99.99%); Ytterbium (III) Oxide ($Yb_2O_3$, 99.9%); yttrium (III) nitrate hexahydrate ($Y(NO_3)_3 \cdot 6H_2O$, 99.8%); dodec-1-ene (1-C12, 168.32 g/mole, linear, ≥99.0%). Molecular weight of dodecyl-MEG equal to 230.39 g/mole.

Beta zeolite CP814E, having a $SiO_2/Al_2O_3$ mole ratio of 25 in ammonium ($NH_4^+$) form, available from Zeolyst International. Calcine the CP814E Beta zeolite in a muffle furnace (Lindberg blue M) with constant air flow (~40-60 L/min) at 550° C. for at least 12 h before use. Prepare the yttrium (III) oxide ($Y_2O_3$) by thermal decomposition of yttrium (III) nitrate hexahydrate at 600° C. for at least 5 hours (h) in air flow (100 mL/min). Air flow as used herein means atmospheric air.

Gas chromatography (GC) for the following examples was conducted on an Agilent 7890B gas chromatography instrument having an FID detector. Prepare gas chromatography samples by mixing 100 μL of the example with 10 mL of gas chromatography solution that was prepared by addition of 1 mL of hexadecane in 1 L of ethyl acetate. Determine the total amount of 1-dodecene derived species, which includes monoalkyl ether, dialkyl ether and 2-dodecanol, total amount of dodecene, which includes 1-dodecene and all non 1-dodecene other $C_{12}$ isomers. Table 1 provides the relevant gas chromatography instrument parameters.

TABLE 1

| | |
|---|---|
| Chromatograph: | Agilent 7890 Series GC |
| Column: | Agilent HP88, 100 m × 0.25 mm × 0.20 um |
| Detector | FID |
| Oven: | 50° C.-7 min-6° C./min-260° C.-1 min |
| Injector: | 250° C. |
| Detector: | 300° C. |
| Carrier: | Helium 2.0 mL/min constant flow mode |
| Split ratio: | 10 |
| Make-Up: | Nitrogen 25mL/min |
| Air: | 400 mL/min |
| Hydrogen: | 40 mL/min |
| Inlet Liner: | Restek PN 23305.5 Sky Precision Liner with wool |
| Sample Size: | 1 μL |
| GC vial rinsing solvent: | ethyl acetate |

Calculations

In the following Examples (EX) and Comparative Examples (CE) the yields (mol %) of product and by-products and catalyst performance metrics are calculated based on GC results as follows.

Olefin conversion (%): Calculate the percent olefin conversion by dividing the total amount of dodecene derived species by the summation of total amount of dodecene derived species and the amount of dodecene. Multiply the quotient by 100.

ME selectivity (%): Calculate the percent monoalkyl ether selectivity by dividing the total amount of monoalkyl ether by the total amount of dodecene derived species. Multiply the quotient by 100.

ME yield (%): Calculate the monoalkyl ether yield by multiplying the olefin conversion value by the monoalkyl ether selectivity value.

Reactions

The etherification reaction for the Examples and Comparative Example is as follows. The reactor block consists of a heated block that holds 48 40 mL straight-walled glass scintillation vials. A flat, circular rare-earth magnet discs (VP 772FN-13-13-150, V&P Scientific, Inc.) were used. The reactor consists of a transverse-mounted spinning magnetic cylinder that causes magnetic stir elements to tumble end-over-end. Stirring speed is controlled through an inverter; for a typical run, the stirring is set to 70, which corresponds to a rate of rotation of the magnetic cylinder of 800 RPM. The GC samples were prepared by adding the liquid sample in 10 mL of internal standard solution (1 mL of hexadecane dissolved in 1 L of ethyl acetate) and analyzed offline by an Agilent 7890B GC with instrument parameters described above.

Results

TABLE 2

Catalytic performance of physical mixture of Beta zeolite with SiO$_2$/Al$_2$O$_3$ = 25 (0.25 g) with Y$_2$O$_3$ (0.25 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | ME Selectivity, % | Di-ether Ether Selectivity, % | ME rate, g ME/g Catalyst/h | ME cumulative yield, %/g Catalyst |
|---|---|---|---|---|---|---|---|
| CE A | 1 | 0.25 | 2.6 | 100 | 0 | 0.879 | 10.3 |
| EX 1 | 1 | 0.25 + 0.25 g Y$_2$O$_3$ | 3.1 | 93.6 | 6.4 | 0.979 | 11.5 |
| CE A | 1.5 | 0.25 | 3.2 | 97.0 | 3.0 | 0.699 | 12.3 |
| EX 1 | 1.5 | 0.25 + 0.25 g Y$_2$O$_3$ | 4.1 | 95.0 | 5.0 | 0.872 | 15.4 |
| CE A | 2 | 0.25 | 3.3 | 97.2 | 2.8 | 0.548 | 12.9 |
| EX 1 | 2 | 0.25 + 0.25 g Y$_2$O$_3$ | 4.9 | 93.6 | 6.4 | 0.776 | 18.3 |
| CE A | 3 | 0.25 | 3.8 | 97.5 | 2.5 | 0.425 | 15.0 |
| EX 1 | 3 | 0.25 + 0.25 g Y$_2$O$_3$ | 6.3 | 92.4 | 7.6 | 0.655 | 23.2 |

Table 2 shows the impact of the addition of 0.25 g of Y$_2$O$_3$ to Beta zeolite with SiO$_2$/Al$_2$O$_3$=25 on the catalytic performance for etherification of dodec-1-ene with MEG at 135° C. for 1, 1.5, 2, and 3 hours (h). The physical mixture of Y$_2$O$_3$ and Catalyst showed olefin conversion of 7.6% after 3 hours of reaction with mono-ether cumulative yield of 23.2%/g of zeolite while Catalyst without Y$_2$O$_3$ addition showed olefin conversion of 2.5% with mono-ether cumulative yield of 15%/g of Catalyst.

TABLE 3

Catalytic performance of physical mixture of Beta zeolite with SiO$_2$/Al$_2$O$_3$ = 25 (0.375 g) with Y$_2$O$_3$ (0.125 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.375 | 2.9 | 96.7 | 3.3 | 1.266 | 7.4 |
| EX 1 | 0.5 | 0.375 + 0.125 g Y$_2$O$_3$ | 3.0 | 94.1 | 5.9 | 1.280 | 7.5 |
| CE A | 1 | 0.375 g | 4.1 | 97.6 | 2.4 | 0.901 | 10.6 |
| EX 1 | 1 | 0.375 + 0.125 g Y$_2$O$_3$ | 4.7 | 93.9 | 6.1 | 1.000 | 11.8 |
| CE A | 1.5 | 0.375 g | 4.8 | 98.0 | 2.0 | 0.714 | 12.6 |
| EX 1 | 1.5 | 0.375 + 0.125 g Y$_2$O$_3$ | 6.8 | 92.5 | 7.5 | 0.945 | 16.7 |
| CE A | 2 | 0.375 g | 5.1 | 98.2 | 1.8 | 0.572 | 13.5 |
| EX 1 | 2 | 0.375 + 0.125 g Y$_2$O$_3$ | 8.3 | 91.7 | 8.3 | 0.863 | 20.3 |
| CE A | 3 | 0.375 g | 6.0 | 98.4 | 1.6 | 0.444 | 15.7 |
| EX 1 | 3 | 0.375 + 0.125 g Y$_2$O$_3$ | 11.6 | 90.1 | 9.9 | 0.786 | 27.8 |

Table 3 shows the impact of the addition of 0.125 g of Y$_2$O$_3$ to 0.375 g of Beta zeolite with SiO$_2$/Al$_2$O$_3$=25 on the catalytic performance for etherification of dodec-1-ene with MEG at 135° C. for 0.5, 1, 1.5, 2, and 3 h. The physical mixture of Y$_2$O$_3$ and Catalyst showed olefin conversion of 9.9% after 3 hours of reaction with mono-ether cumulative yield of 27.8%/g of zeolite while Catalyst without Y$_2$O$_3$ addition showed olefin conversion of 1.6% with mono-ether cumulative yield of 15.7%/g of Catalyst.

TABLE 4

Catalytic performance of physical mixture of Beta zeolite with $SiO_2/Al_2O_3 =$ 25 (0.4375 g) with $Y_2O_3$ (0.0625 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.4375 | 3.5 | 97.3 | 2.7 | 1.308 | 7.7 |
| EX 1 | 0.5 | 0.4375 + 0.0625 g $Y_2O_3$ | 4.0 | 93.5 | 6.5 | 1.463 | 8.6 |
| CE A | 1 | 0.4375 | 5.2 | 96.3 | 3.7 | 0.975 | 11.5 |
| EX 1 | 1 | 0.4375 + 0.0625 g $Y_2O_3$ | 6.1 | 93.5 | 6.5 | 1.111 | 13.1 |
| CE A | 1.5 | 0.4375 | 6.3 | 97.0 | 3.0 | 0.796 | 14.1 |
| EX 1 | 1.5 | 0.4375 + 0.0625 g $Y_2O_3$ | 7.8 | 92.1 | 7.9 | 0.928 | 16.4 |
| CE A | 2 | 0.4375 | 6.7 | 97.3 | 2.7 | 0.635 | 14.9 |
| EX 1 | 2 | 0.4375 + 0.0625 g $Y_2O_3$ | 9.1 | 91.1 | 8.9 | 0.801 | 18.9 |
| CE A | 3 | 0.4375 | 7.9 | 97.6 | 2.4 | 0.498 | 17.6 |
| EX 1 | 3 | 0.4375 + 0.0625 g $Y_2O_3$ | 12.0 | 89.4 | 10.6 | 0.695 | 24.6 |

Table 4 shows the impact of the addition of 0.0625 g of $Y_2O_3$ to 0.4375 g of Beta zeolite with $SiO_2/Al_2O_3=25$ on the catalytic performance for etherification of dodec-1-ene with MEG at 135° C. for 0.5, 1, 1.5, 2, and 3 h. The physical mixture of $Y_2O_3$ and Catalyst showed olefin conversion of 10.6% after 3 hours of reaction with mono-ether cumulative yield of 24.6%/g of zeolite while Catalyst without $Y_2O_3$ addition showed olefin conversion of 2.4% with mono-ether cumulative yield of 17.6%/g of Catalyst.

TABLE 5

Catalytic performance of physical mixture of Beta zeolite with $SiO_2/Al_2O_3 =$ 25 (0.25 g) with $La_2O_3$ (0.25 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 1 | 0.25 | 2.6 | 100 | 0 | 0.879 | 10.3 |
| EX 2 | 1 | 0.25 + 0.25 g $La_2O_3$ | 3.1 | 94.0 | 6.0 | 0.994 | 11.7 |
| CE A | 1.5 | 0.25 | 3.2 | 97.0 | 3.0 | 0.699 | 12.3 |
| EX 2 | 1.5 | 0.25 + 0.25 g $La_2O_3$ | 3.7 | 94.7 | 5.1 | 0.805 | 14.2 |
| CE A | 2 | 0.25 | 3.3 | 97.2 | 2.8 | 0.548 | 12.9 |
| EX 2 | 2 | 0.25 + 0.25 g $La_2O_3$ | 4.1 | 95.1 | 4.9 | 0.654 | 15.4 |
| CE A | 3 | 0.25 | 3.8 | 97.5 | 2.5 | 0.425 | 15.0 |
| EX 2 | 3 | 0.25 + 0.25 g $La_2O_3$ | 4.5 | 96.0 | 4.0 | 0.494 | 17.5 |

Table 5 shows the impact of the addition of 0.25 g of $La_2O_3$ to 0.25 g of Beta zeolite with $SiO_2/Al_2O_3=25$ on the catalytic performance for etherification of dodec-1-ene with MEG at 135° C. for 1, 1.5, 2, and 3 h. The physical mixture of $La_2O_3$ and Catalyst showed olefin conversion of 4% after 3 hours of reaction with mono-ether cumulative yield of 17.5%/g of zeolite while Catalyst without $La_2O_3$ addition showed olefin conversion of 2.5% with mono-ether cumulative yield of 15%/g of Catalyst.

TABLE 6

Catalytic performance of physical mixture of Beta zeolite with $SiO_2/Al_2O_3$ = 25 (0.375 g) with $La_2O_3$ (0.125 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.375 | 2.9 | 96.7 | 3.3 | 1.266 | 7.4 |
| EX 2 | 0.5 | 0.375 + 0.125 g $La_2O_3$ | 3.9 | 95.1 | 4.9 | 1.674 | 9.8 |
| CE A | 1 | 0.375 | 4.1 | 97.6 | 2.4 | 0.901 | 10.6 |
| EX 2 | 1 | 0.375 + 0.125 g $La_2O_3$ | 5.0 | 94.5 | 5.5 | 1.079 | 12.7 |
| CE A | 1.5 | 0.375 | 4.8 | 98.0 | 2.0 | 0.714 | 12.6 |
| EX 2 | 1.5 | 0.375 + 0.125 g $La_2O_3$ | 6.1 | 93.5 | 6.5 | 0.855 | 15.1 |
| CE A | 2 | 0.375 g | 5.1 | 98.2 | 1.8 | 0.572 | 13.5 |
| EX 2 | 2 | 0.375 + 0.125 g $La_2O_3$ | 6.4 | 94.3 | 5.74 | 0.682 | 16.1 |
| CE A | 3 | 0.375 | 6.0 | 98.4 | 1.6 | 0.444 | 15.7 |
| EX 2 | 3 | 0.375 + 0.125 g $La_2O_3$ | 7.3 | 93.6 | 6.4 | 0.519 | 18.3 |

Table 6 shows the impact of the addition of 0.125 g of $La_2O_3$ to 0.375 g of Beta zeolite with $SiO_2/Al_2O_3$=25 on the catalytic performance for etherification of dodec-1-ene with MEG at 135° C. for 0.5, 1, 1.5, 2, and 3 h. The physical mixture of $La_2O_3$ and Catalyst showed olefin conversion of 6.4% after 3 hours of reaction with mono-ether cumulative yield of 18.3%/g of zeolite while Catalyst without $La_2O_3$ addition showed olefin conversion of 1.6% with mono-ether cumulative yield of 15.7%/g of Catalyst.

TABLE 7

Catalytic performance of physical mixture of Beta zeolite with $SiO_2/Al_2O_3$ = 25 (0.25 g) with $Ho_2O_3$ (0.25 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 1 | 0.25 | 2.6 | 100 | 0 | 0.879 | 10.3 |
| EX 3 | 1 | 0.25 + 0.25 g $Ho_2O_3$ | 5.5 | 94.8 | 5.2 | 1.759 | 20.7 |
| CE A | 1.5 | 0.25 | 3.2 | 97.0 | 3.0 | 0.699 | 12.3 |
| EX 3 | 1.5 | 0.25 + 0.25 g $Ho_2O_3$ | 6.7 | 94.2 | 5.8 | 1.426 | 25.2 |
| CE A | 2 | 0.25 | 3.3 | 97.2 | 2.8 | 0.548 | 12.9 |
| EX 3 | 2 | 0.25 + 0.25 g $Ho_2O_3$ | 7.2 | 93.6 | 6.4 | 1.149 | 27.1 |
| CE A | 3 | 0.25 | 3.8 | 97.5 | 2.5 | 0.425 | 15.0 |
| EX 3 | 3 | 0.25 + 0.25 g $Ho_2O_3$ | 8.2 | 93.4 | 6.6 | 0.872 | 30.8 |

Table 7 demonstrates the impact of the addition of 0.25 g of $Ho_2O_3$ to 0.25 g of Beta zeolite with $SiO_2/Al_2O_3$=25 on the catalytic performance for etherification of dodec-1-ene with MEG at 135° C. for 1, 1.5, 2, and 3 h. The physical mixture of $Ho_2O_3$ and Catalyst showed olefin conversion of 6.6% after 3 hours of reaction with mono-ether cumulative yield of 30.8%/g of zeolite while Catalyst without $Ho_2O_3$ addition showed olefin conversion of 2.5% with mono-ether cumulative yield of 15%/g of Catalyst.

TABLE 8

Catalytic performance of physical mixture of Beta zeolite with $SiO_2/Al_2O_3$ = 25 (0.375 g) with $Ho_2O_3$ (0.125 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.375 | 2.9 | 96.7 | 3.3 | 1.266 | 7.4 |
| EX 3 | 0.5 | 0.375 + 0.125 g $Ho_2O_3$ | 5.0 | 94.2 | 5.8 | 2.124 | 12.5 |
| CE A | 1 | 0.375 | 4.1 | 97.6 | 2.4 | 0.901 | 10.6 |
| EX 3 | 1 | 0.375 + 0.125 g $Ho_2O_3$ | 6.7 | 95.5 | 4.5 | 1.449 | 17.1 |
| CE A | 1.5 | 0.375 | 4.8 | 98.0 | 2.0 | 0.714 | 12.6 |
| EX 3 | 1.5 | 0.375 + 0.125 g $Ho_2O_3$ | 7.8 | 95.0 | 5.0 | 1.118 | 19.8 |
| CE A | 2 | 0.375 | 5.1 | 98.2 | 1.8 | 0.572 | 13.5 |
| EX 3 | 2 | 0.375 + 0.125 g $Ho_2O_3$ | 8.3 | 95.4 | 4.6 | 0.897 | 21.1 |
| CE A | 3 | 0.375 | 6.0 | 98.4 | 1.6 | 0.444 | 15.7 |
| EX 3 | 3 | 0.375 + 0.125 g $Ho_2O_3$ | 9.3 | 95.0 | 5.0 | 0.665 | 23.5 |

Table 8 shows the impact of the addition of 0.125 g of $Ho_2O_3$ to 0.375 g of Beta zeolite with $SiO_2/Al_2O_3$=25 on the catalytic performance for etherification of dodec-1-ene with MEG at 135° C. for 0.5, 1, 1.5, 2, and 3 h. The physical mixture of $Ho_2O_3$ and Catalyst showed olefin conversion of 5% after 3 hours of reaction with mono-ether cumulative yield of 23.5%/g of zeolite while Catalyst without $Ho_2O_3$ addition showed olefin conversion of 1.6% with mono-ether cumulative yield of 15.7%/g of Catalyst.

TABLE 9

Catalytic performance of physical mixture of Beta zeolite with $SiO_2/Al_2O_3$ = 25 (0.25 g) with $Gd_2O_3$ (0.25 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 1 | 0.25 | 2.6 | 100 | 0 | 0.879 | 10.3 |
| EX 4 | 1 | 0.25 + 0.25 g $Gd_2O_3$ | 4.1 | 95.5 | 4.5 | 1.321 | 15.6 |
| CE A | 1.5 | 0.25 | 3.2 | 97.0 | 3.0 | 0.699 | 12.3 |
| EX 4 | 1.5 | 0.25 + 0.25 g $Gd_2O_3$ | 5.2 | 94.5 | 5.5 | 1.121 | 19.8 |
| CE A | 2 | 0.25 | 3.3 | 97.2 | 2.8 | 0.548 | 12.9 |
| EX 4 | 2 | 0.25 + 0.25 g $Gd_2O_3$ | 6.0 | 93.9 | 6.1 | 0.957 | 22.5 |
| CE A | 3 | 0.25 | 3.8 | 97.5 | 2.5 | 0.425 | 15.0 |
| EX 4 | 3 | 0.25 + 0.25 g $Gd_2O_3$ | 7.3 | 93.6 | 6.4 | 0.775 | 27.4 |

Table 9 demonstrates the impact of the addition of 0.25 g of $Gd_2O_3$ to 0.25 g of Beta zeolite with $SiO_2/Al_2O_3$=25 on the catalytic performance for etherification of dodec-1-ene with MEG at 135° C. for 1, 1.5, 2, and 3 h. The physical mixture of $Gd_2O_3$ and Catalyst showed olefin conversion of 6.4% after 3 hours of reaction with mono-ether cumulative yield of 27.4%/g of zeolite while Catalyst without $Gd_2O_3$ addition showed olefin conversion of 2.5% with mono-ether cumulative yield of 15%/g of Catalyst.

TABLE 10

Catalytic performance of physical mixture of Beta zeolite with $SiO_2/Al_2O_3 =$ 25 (0.375 g) with $Gd_2O_3$ (0.125 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.375 g | 2.9 | 96.7 | 3.3 | 1.266 | 7.4 |
| EX 4 | 0.5 | 0.375 + 0.125 g $Gd_2O_3$ | 3.4 | 97.3 | 2.7 | 1.511 | 8.9 |
| CE A | 1 | 0.375 g | 4.1 | 97.6 | 2.4 | 0.901 | 10.6 |
| EX 4 | 1 | 0.375 + 0.125 g $Gd_2O_3$ | 4.7 | 96.0 | 4.0 | 1.012 | 11.9 |
| CE A | 1.5 | 0.375 g | 4.8 | 98.0 | 2.0 | 0.714 | 12.6 |
| EX 4 | 1.5 | 0.375 + 0.125 g $Gd_2O_3$ | 5.4 | 96.3 | 3.7 | 0.789 | 13.9 |
| CE A | 2 | 0.375 g | 5.1 | 98.2 | 1.8 | 0.572 | 13.5 |
| EX 4 | 2 | 0.375 + 0.125 g $Gd_2O_3$ | 5.9 | 96.9 | 3.1 | 0.642 | 15.1 |
| CE A | 3 | 0.375 g | 6.0 | 98.4 | 1.6 | 0.444 | 15.7 |
| EX 4 | 3 | 0.375 + 0.125 g $Gd_2O_3$ | 6.7 | 95.8 | 4.2 | 0.483 | 17.1 |

Table 10 shows the impact of the addition of 0.125 g of $Gd_2O_3$ to 0.375 g of Beta zeolite with $SiO_2/Al_2O_3=25$ on the catalytic performance for etherification of dodec-1-ene with MEG at 135° C. for 0.5, 1, 1.5, 2, and 3 h. The physical mixture of $Gd_2O_3$ and Catalyst showed olefin conversion of 4.2% after 3 hours of reaction with mono-ether cumulative yield of 17.1%/g of zeolite while Catalyst without $Gd_2O_3$ addition showed olefin conversion of 1.6% with mono-ether cumulative yield of 15.7%/g of Catalyst.

TABLE 11

Catalytic performance of physical mixture of Beta zeolite with $SiO_2/Al_2O_3 =$ 25 (0.25 g) with $Nd_2O_3$ (0.25 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 1 | 0.25 | 2.6 | 100 | 0 | 0.879 | 10.3 |
| EX 5 | 1 | 0.25 + 0.25 g $Nd_2O_3$ | 3.3 | 100 | 0 | 1.116 | 13.1 |
| CE A | 1.5 | 0.25 | 3.2 | 97.0 | 3.0 | 0.699 | 12.3 |
| EX 5 | 1.5 | 0.25 + 0.25 g $Nd_2O_3$ | 3.8 | 95.0 | 5.0 | 0.817 | 14.4 |
| CE A | 2 | 0.25 | 3.3 | 97.2 | 2.8 | 0.548 | 12.9 |
| EX 5 | 2 | 0.25 + 0.25 g $Nd_2O_3$ | 4.2 | 95.8 | 4.2 | 0.679 | 16.0 |
| CE A | 3 | 0.25 | 3.8 | 97.5 | 2.5 | 0.425 | 15.0 |
| EX 5 | 3 | 0.25 + 0.25 g $Nd_2O_3$ | 4.9 | 94.4 | 5.6 | 0.528 | 18.7 |

Table 11 demonstrates the impact of the addition of 0.25 g of $Nd_2O_3$ to 0.25 g of Beta zeolite with $SiO_2/Al_2O_3=25$ on the catalytic performance for etherification of dodec-1-ene with MEG at 135° C. for 1, 1.5, 2, and 3 h. The physical mixture of $Nd_2O_3$ and Catalyst showed olefin conversion of 5.6% after 3 hours of reaction with mono-ether cumulative yield of 18.7%/g of zeolite while Catalyst without $Nd_2O_3$ addition showed olefin conversion of 2.5% with mono-ether cumulative yield of 15%/g of Catalyst.

TABLE 12

Catalytic performance of physical mixture of Beta zeolite with $SiO_2/Al_2O_3$ = 25 (0.375 g) with $Nd_2O_3$ (0.125 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.375 g | 2.9 | 96.7 | 3.3 | 1.266 | 7.4 |
| EX 5 | 0.5 | 0.375 + 0.125 g $Nd_2O_3$ | 4.5 | 95.8 | 4.2 | 1.965 | 11.6 |
| CE A | 1 | 0.375 g | 4.1 | 97.6 | 2.4 | 0.901 | 10.6 |
| EX 5 | 1 | 0.375 + 0.125 g $Nd_2O_3$ | 6.8 | 92.9 | 7.1 | 1.431 | 16.8 |
| CE A | 1.5 | 0.375 g | 4.8 | 98.0 | 2.0 | 0.714 | 12.6 |
| EX 5 | 1.5 | 0.375 + 0.125 g $Nd_2O_3$ | 8.0 | 92.8 | 7.2 | 1.119 | 19.8 |
| CE A | 2 | 0.375 g | 5.1 | 98.2 | 1.8 | 0.572 | 13.5 |
| EX 5 | 2 | 0.375 + 0.125 g $Nd_2O_3$ | 8.6 | 92.3 | 7.7 | 0.903 | 21.3 |
| CE A | 3 | 0.375 g | 6.0 | 98.4 | 1.6 | 0.444 | 15.7 |
| EX 5 | 3 | 0.375 + 0.125 g $Nd_2O_3$ | 10.2 | 91.6 | 8.4 | 0.705 | 24.9 |

Table 12 shows the impact of the addition of 0.125 g of $Nd_2O_3$ to 0.375 g of Beta zeolite with $SiO_2/Al_2O_3$=25 on the catalytic performance for etherification of dodec-1-ene with MEG at 135° C. for 0.5, 1, 1.5, 2, and 3 h. The physical mixture of $Nd_2O_3$ and Catalyst showed olefin conversion of 8.4% after 3 hours of reaction with mono-ether cumulative yield of 24.9%/g of zeolite while Catalyst without $Nd_2O_3$ addition showed olefin conversion of 1.6% with mono-ether cumulative yield of 15.7%/g of Catalyst.

TABLE 13

Catalytic performance of physical mixture of Beta zeolite with $SiO_2/Al_2O_3$ = 25 (0.25 g) with $Yb_2O_3$ (0.25 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 1 | 0.25 | 2.6 | 100 | 0 | 0.879 | 10.3 |
| EX 6 | 1 | 0.25 + 0.25 g $Yb_2O_3$ | 5.2 | 94.5 | 5.5 | 1.653 | 19.5 |
| CE A | 1.5 | 0.25 | 3.2 | 97.0 | 3.0 | 0.699 | 12.3 |
| EX 6 | 1.5 | 0.25 + 0.25 g $Yb_2O_3$ | 6.1 | 95.3 | 4.7 | 1.313 | 23.2 |
| CE A | 2 | 0.25 | 3.3 | 97.2 | 2.8 | 0.548 | 12.9 |
| EX 6 | 2 | 0.25 + 0.25 g $Yb_2O_3$ | 6.5 | 95.6 | 4.4 | 1.051 | 24.8 |
| CE A | 3 | 0.25 | 3.8 | 97.5 | 2.5 | 0.425 | 15.0 |
| EX 6 | 3 | 0.25 + 0.25 g $Yb_2O_3$ | 7.2 | 94.9 | 5.1 | 0.778 | 27.5 |

Table 13 demonstrates the impact of the addition of 0.25 g of $Yb_2O_3$ to 0.25 g of Beta zeolite with $SiO_2/Al_2O_3$=25 on the catalytic performance for etherification of dodec-1-ene with MEG at 135° C. for 1, 1.5, 2, and 3 h. The physical mixture of $Yb_2O_3$ and Catalyst showed olefin conversion of 5.1% after 3 hours of reaction with mono-ether cumulative yield of 27.5%/g of zeolite while Catalyst without $Yb_2O_3$ addition showed olefin conversion of 2.5% with mono-ether cumulative yield of 15%/g of Catalyst.

TABLE 14

Catalytic performance of physical mixture of Beta zeolite with SiO$_2$/Al$_2$O$_3$ = 25 (0.375 g) with Yb$_2$O$_3$ (0.125 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Mono-ether Selectivity, % | Di-ether Ether Selectivity, % | ME rate, g ME/g Catalyst/h | ME cumulative yield %/g Catalyst |
|---|---|---|---|---|---|---|---|
| CE A | 0.5 | 0.375 g | 2.9 | 96.7 | 3.3 | 1.266 | 7.4 |
| EX 6 | 0.5 | 0.375 + 0.125 g Yb$_2$O$_3$ | 4.5 | 95.7 | 4.3 | 1.965 | 11.6 |
| CE A | 1 | 0.375 g | 4.1 | 97.6 | 2.4 | 0.901 | 10.6 |
| EX 6 | 1 | 0.375 + 0.125 g Yb$_2$O$_3$ | 6.3 | 95.5 | 4.5 | 1.359 | 16.0 |
| CE A | 1.5 | 0.375 g | 4.8 | 98.0 | 2.0 | 0.714 | 12.6 |
| EX 6 | 1.5 | 0.375 + 0.125 g Yb$_2$O$_3$ | 7.3 | 96.0 | 4.0 | 1.059 | 18.7 |
| CE A | 2 | 0.375 g | 5.1 | 98.2 | 1.8 | 0.572 | 13.5 |
| EX 6 | 2 | 0.375 + 0.125 g Yb$_2$O$_3$ | 7.7 | 96.3 | 3.7 | 0.841 | 19.8 |
| CE A | 3 | 0.375 g | 6.0 | 98.4 | 1.6 | 0.444 | 15.7 |
| EX 6 | 3 | 0.375 + 0.125 g Yb$_2$O$_3$ | 8.4 | 95.5 | 4.5 | 0.603 | 21.3 |

Table 14 shows the impact of the addition of 0.125 g of Yb$_2$O$_3$ to 0.375 g of Beta zeolite with SiO$_2$O$_3$=25 on the catalytic performance for etherification of dodec-1-ene with MEG at 135° C. for 0.5, 1, 1.5, 2, and 3 h. The physical mixture of Yb$_2$O$_3$ and Catalyst showed olefin conversion of 4.5% after 3 hours of reaction with mono-ether cumulative yield of 21.3%/g of zeolite while Catalyst without Yb$_2$O$_3$ addition showed olefin conversion of 1.6% with mono-ether cumulative yield of 15.7%/g of Catalyst.

TABLE 15

Catalytic performance of Y$_2$O$_3$ (0.5 g) tested for etherification reaction.
Reaction conditions: 6.2 g of dodec-1-ene, 6.7 g of MEG, 135° C.

| Catalyst | Reaction time, h | Catalyst amount, g | Olefin Conversion, % | Monoether Selectivity, % | Di-ether Ether Selectivity, % |
|---|---|---|---|---|---|
| EX 1 | 0.5 | 0.5 | 0 | 0 | 0 |
| EX 1 | 1 | 0.5 | 0 | 0 | 0 |
| EX 1 | 1.5 | 0.5 | 0.1 | 100 | 0 |
| EX 1 | 2 | 0.5 | 0.2 | 100 | 0 |
| EX 1 | 3 | 0.5 | 0.2 | 100 | 0 |

Table 15 summarizes catalytic performance of 0.5 g of Y$_2$O$_3$ for etherification of dodec-1-ene with MEG at 135° C. for 0.5, 1, 1.5, 2, and 3 h. Y$_2$O$_3$ showed residual activity in conversion of dodec-1-ene. After 3 h the olefin conversion was 0.2%.

What is claimed is:

1. A process for producing a (poly)alkylene glycol monoalkyl ether, comprising:
   providing a physical admixture of a crystalline metallosilicate molecular sieve catalyst and an oxide of a metal,
     wherein the metal is selected from the group consisting of a Group 3 metal, a Lanthanide element and a combination thereof, and
     wherein the physical admixture comprises the crystalline metallosilicate molecular sieve catalyst in an amount of 25% to 90% by weight, and the metal oxide in an amount of 10% to 75% by weight; and
   reacting in a liquid phase process an olefin and a (poly)alkylene glycol in the presence of the admixture of the crystalline metallosilicate molecular sieve catalyst and the oxide of the metal to yield the (poly)alkylene glycol monoalkyl ether.

2. The process of claim 1, wherein the crystalline metallosilicate molecular sieve catalyst is a crystalline metallosilicate molecular sieve catalyst having a pore size of 0.5 to 1.2 nanometer.

3. The process of claim 1, wherein the crystalline metallosilicate molecular sieve catalyst is an aluminosilicate zeolite catalyst.

4. The process of claim 1, wherein the crystalline metallosilicate molecular sieve catalyst is a BEA-Type zeolite structure.

5. The process of claim 1, wherein the crystalline metallosilicate molecular sieve catalyst includes a proton (H$^+$) to provide Brønsted acid sites.

6. The process of claim 1, wherein the crystalline metallosilicate molecular sieve catalyst contains at least one metal element selected from the group consisting of Fe, Ga and B.

7. The process of claim 1, wherein the crystalline metallosilicate molecular sieve catalyst has a silicon-to-metal atomic ratio of 5 to 150.

8. The process of claim 1, wherein the metal of the oxide is selected from the group consisting of elements Yttrium, Lanthanum, Neodymium, Gadolinium, Holmium, Ytterbium and combinations thereof.

9. The process of claim 8, wherein the metal of the oxide is selected from the group consisting of Y$_2$O$_3$, La$_2$O$_3$, Nd$_2$O$_3$, Gd$_2$O$_3$, Ho$_2$O$_3$, Yb$_2$O$_3$, and combinations thereof.

10. The process of claim 1, wherein the olefin is an alpha-olefin having 6 to 30 carbon atoms.

11. The process of claim 1, wherein the (poly)alkylene glycol has 2 to 8 carbon atoms.

12. The process of claim 11, wherein the (poly)alkylene glycol is mono-ethylene glycol.

13. The process of claim 1, wherein reacting the olefin and the (poly)alkylene glycol in the presence of the admixture is at a temperature of 80° C. to 200° C.

14. The process of claim 13, wherein reacting the olefin and the (poly)alkylene glycol in the presence of the admixture is at a temperature of 100° C. to 150° C.

15. The process of claim 1, wherein the physical admixture is prepared at a temperature ranging from 20° C. to 25° C. and a pressure ranging from 100,000 Pa to 105,000 Pa.

* * * * *